United States Patent [19]

Sekimoto et al.

[11] 4,425,585

[45] Jan. 10, 1984

[54] VIDEO TAPE RECORDER IMMUNE TO THIRD-ORDER DISTORTION NOISE

[75] Inventors: Kunio Sekimoto, Katano; Katsuhiko Yamamoto, Neyagawa; Chojuro Yamamitsu, Kawanishi; Kozo Kurashina, Yahata, all of Japan

[73] Assignee: Matsushita Electric Industrial Company, Limited, Osaka, Japan

[21] Appl. No.: 253,883

[22] Filed: Apr. 13, 1981

[30] Foreign Application Priority Data

Apr. 14, 1980 [JP] Japan ................................. 55-49378

[51] Int. Cl.³ ..................... H04N 9/491; G11B 5/02
[52] U.S. Cl. ................................ 358/328; 358/330; 360/20
[58] Field of Search ................... 358/310, 328, 330; 360/20

[56] References Cited

U.S. PATENT DOCUMENTS

| | | | |
|---|---|---|---|
| 2,960,563 | 11/1960 | Anderson | 358/330 |
| 3,234,323 | 2/1966 | Kihara | 358/330 X |
| 3,580,990 | 5/1971 | Numakura | 358/330 |
| 3,660,596 | 5/1972 | Numakura | 360/20 X |
| 3,715,468 | 2/1973 | Fujita | 358/328 |
| 3,982,272 | 9/1976 | Verhoeven et al. | 358/330 |

*Primary Examiner*—Aristotelis M. Psitos
*Attorney, Agent, or Firm*—Lowe, King, Price & Becker

[57] ABSTRACT

A portable video tape recorder for broadcasting applications comprises a pair of video heads mounted diametrically opposite to each other on the circumference of a rotary cylinder. High and low frequency carriers are modulated by frequency modulators with I and Q signals, respectively, and frequency division multiplexed for application to the video heads. The frequency values of the carriers are selected so that third-order distortion noise caused by the hysteresis characteristics of the video heads and the magnetic tape may fall within a frequency range differing from the frequencies of the modulated carriers by an amount greater than the bandwidth of the I and Q signals which are demodulated by frequency demodulators to prevent the occurrence of beat interference in the frequency band of the reproduced video signal.

12 Claims, 7 Drawing Figures

DIRECTION OF ROTATION

VIDEO TAPE RECORDER IMMUNE TO THIRD-ORDER DISTORTION NOISE

BACKGROUND OF THE INVENTION

The present invention relates to apparatus for recording a video signal, and has, for its object, the provision of a video tape recorder which reproduces an image free from unwanted signal components.

Conventional video tape recorders which are extensively used for various applications are of the helical scan type in which the magnetic tape is scanned by rotating heads at skewed angles. In particular, household video tape recorders are made compact by the use of high-packing density techniques. For example, video tape recorders of the VHS type employ a rotary cylinder of 62 mm diameter and a pair of video heads mounted at 180 degrees apart from each other on the circumference of the rotary cylinder for recording video signals along tracks which are slanted to the longitudinal direction of the recording tape. Furthermore, for video tape recorders of the type exclusively for broadcasting use, such as the one used for editing news programs (a portable type known as the type ENG), wherein the compactness and light-weight are of the primary concern, use is made of a magnetic tape having a width of ½ inches. Such broadcasting-use video tape recorders are of the U-standard video tape recorders which are required to meet not only the compactness and light-weight requirements but also high picture quality requirements. With the ¾ inch U-type video tape recorders of the broadcasting applications, use is made of a cylinder having a diameter of 110 millimeters. This size of the cylinder coupled with the fact that it uses ¾ inch tapes makes it difficult to reduce the overall dimensions of the video tape recorder. Furthermore, the method for recording video signals involves removing the low frequency component of the frequency-modulated luminance signal and recording it with a low-frequency converted color carrier signal. This imposes limitations on available frequency bandwidths for the luminance and chrominance signals and as a result video signals for satisfactory color reproduction for broadcasting applications are difficult to achieve. The primary factor that affects the picture quality is the introduction of a third-order distortion noise caused by the hysteresis characteristics of the video heads and magnetic tape.

SUMMARY OF THE INVENTION

The primary object of the present invention is therefore to provide a portable video tape recorder which ensures a high picture quality for broadcasting applications by eliminating third-order distortion caused by the transducer system of the video tape recorder.

The video tape recorder according to the invention includes a pair of transducer heads located diametrically opposite to each other on the circumference of a rotary cylinder, each of the transducer heads having a characteristic producing third-order distortion noise components in the output signal thereof. The recorder comprises a first frequency modulator for frequency modulating a high frequency carrier with a first chrominance signal or I signal for application to the transducer heads, a second frequency modulator for frequency modulating a low frequency carrier with a second chrominance signal or Q signal for application to the transducer heads to record the frequency-modulated carriers in frequency-division multiplex onto a common recording track, a first frequency demodulator receptive of the output of the transducer heads for frequency demodulating the modulated high frequency carrier so that the demodulated high frequency carrier has a bandwidth of a first predetermined value, and a second frequency demodulator receptive of the output of the transducer heads for frequency demodulating the modulated low frequency carrier so that the demodulated low frequency carrier has a bandwidth of a second predetermined value, wherein the high and low frequency carriers have such frequency values that the frequencies of the noise components differ from the frequencies of the demodulated carriers by amounts greater than the bandwidths of the first and second predetermined values.

In a preferred embodiment, the maximum frequency shifts of the modulated high and low frequency carriers are selected to have the same values as the first and second predetermined values of the bandwidths of the demodulated carriers.

In a more specific embodiment, the noise components have a first component whose frequency is three times the frequency of the modulated low frequency carrier and a second component whose frequency equals the frequency difference between the frequency of the modulated high frequency carrier and twice the frequency of the modulated low frequency carrier. The frequency values of the high and low frequency carriers are determined so that the frequencies of the first and second noise components are higher than the frequencies of the modulated carriers by an amount greater than the first and second predetermined values.

BRIEF DESCRIPTION OF THE DRAWINGS

The invention will be further described with reference to the accompanying drawings, in which.

DETAILED DESCRIPTION

Figure 1:
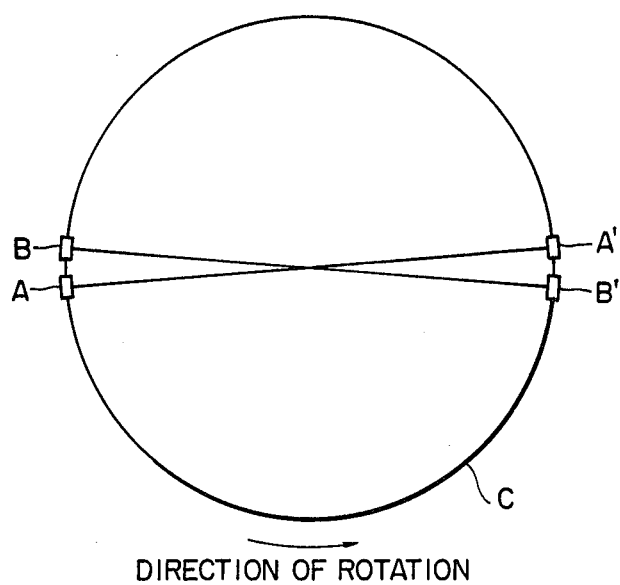
FIG. 1 is a plan view of a rotary cylinder employed in the present invention.
Figure 2:
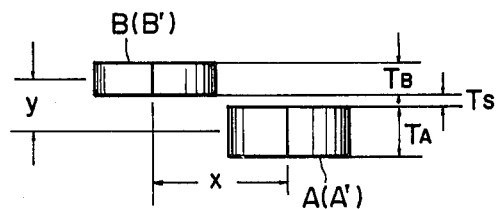
FIG. 2 is an elevational view of video heads mounted on the cylinder of FIG. 1.
Figure 3:
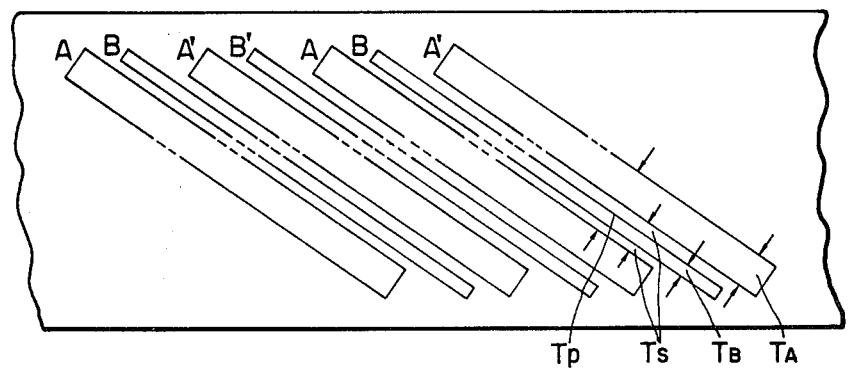
FIG. 3 is an illustration of a track pattern produced by the video heads of FIG. 1.

In FIG. 1 is shown a rotary cylinder C and a pair of video transducer heads A and A' which are mounted diametrically opposite to each other on the cylinder C, and a pair of transducer heads B and B' which are also mounted on the cylinder in a diametrically opposite relationship to each other. As illustrated in FIG. 2, the transducer heads A and A' are mounted on the same height with respect to a reference but spaced a distance Ts below the level where the transducer heads B and B' are mounted. The core width Ta of the transducer heads A and A' is greater than the core width Tb of the heads B and B'. Each of the transducer heads of one pair is angularly displaced from each of the transducer heads of the other pair a center-to-center horizontal spacing X and by a center-to-center spacing Y in the vertical direction. By appropriately dimensioning the design parameters just described and the angle of inclination of the vertical axis of the cylinder to the length of magnetic tape and by applying a frequency-modulated luminance signal to the transducer heads A and A' at alternate horizontal intervals while applying frequency-division multiplexed chrominance signals to the heads B and B' at alternate horizontal intervals, a composite video signal can be recorded in a manner as shown in FIG. 3. By recording the luminance and chrominance signals on separate tracks as shown, a high signal-to-noise ratio can be obtained with respect to the chrominance signal since frequency modulation of the baseband of the chrominance signals (I and Q signals) is permitted. On the other hand, the wider core width results in a wider record track which results in a luminance signal of high signal-to-noise ratio and hence sharply defined images.

Figure 4:
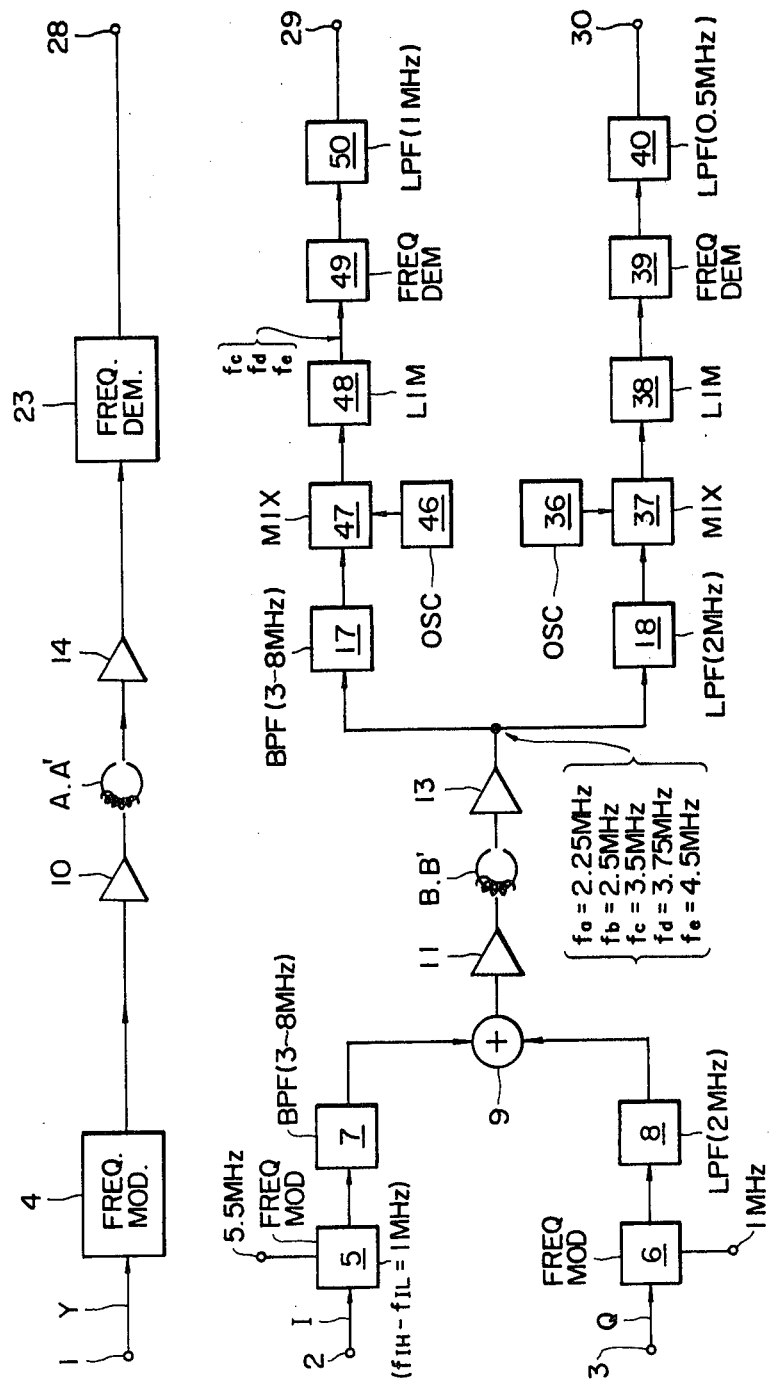
FIG. 4 is an illustration of a block diagram of the invention.

FIG. 4 is a schematic illustration of a part of the video signal recording and playback system.

Figure 5A:
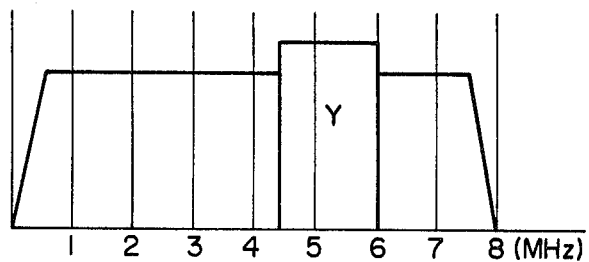
FIGS. 5a and 5b are graphic illustration of the frequency spectrum of the luminance and chrominance signals, respectively.

FIG. 4 is an illustration of an embodiment of the present invention which forms part of the video tape recorder. A frequency modulator 4 is receptive of a luminance or Y signal applied to an input terminal 1 for frequency modulating a carrier supplied from a source, not shown, with the received Y signal so that the frequency-modulated carrier has a bandwidth of up to 8 MHz with a maximum frequency shift of 4.4 MHz to 6 MHz as illustrated in FIG. 5a. The modulated Y signal is amplified at 10 and applied to the video heads A and A' in a well known manner. The video heads A and A' also serve as a playback heads for detecting the recorded luminance signal for application to a frequency demodulator 23 via an amplifier 14. The frequency-demodulated carrier appears at an output terminal 28 which is connected to a later stage of the system for utilization in a well known manner.

Figure 5B:
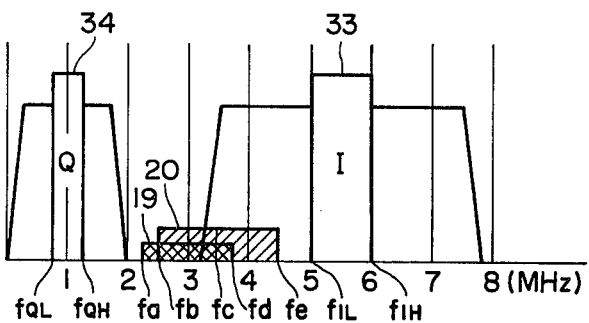

A first frequency modulator 5 frequency modulates a high frequency carrier at 5.5 MHz with a chrominance signal or I signal supplied to an input terminal 2 so that the I-signal modulated carrier has a maximum frequency shift of from 5 MHz to 6 MHz. The output of the frequency modulator 5 is applied to bandpass filter 7 having a passband of 3 MHz of 8 MHz and thence to an input of an adder 9. A second frequency modulator 6 frequency modulates a low frequency carrier at 1 MHz with a Q signal applied to an input terminal 3 such that the Q-signal modulated carrier has a maximum frequency shift of from 0.75 MHz to 1.25 MHz, the output of the frequency modulator 6 being applied to a lowpass filter 8 having a frequency range of up to 2 MHz and thence to another input of the adder 9. Thus, the I and Q signals are frequency-division multiplexed in the adder 9, the multiplexed signals being amplified at 11 and applied to the video heads B and B' in a well known manner and recorded in a common track. FIG. 5b shows the frequency spectrum of the multiplexed I and Q chrominance signals.

Upon reproduction, the video heads B and B' pick up the recorded I and Q signals which are amplified at 13 and applied to a bandpass filter 17 having a passband of 3 MHz to 8 MHz and also to a lowpass filter 18 having a frequency range of up to 2 MHz for separating the multiplexed I and Q signals from each other. The output of the bandpass filter 17 is therefore the I-signal modulated high frequency carrier which is applied to a mixer 47 which is also in receipt of a locally oscillated signal from an oscillator 46. The input signal to the mixer 47 is converted to a high frequency range and applied to a limiter 48 to eliminate noise arising from the fluctuation of level, the output of the limiter 48 being applied to a frequency demodulator 49 and thence to a lowpass filter 50 having a frequency range of up to 1 MHz which is equal to the maximum frequency shift of the modulator 5. The frequency demodulated I signal is available at an output terminal 29. In a similar manner, the output of the lowpass filter 18 is the Q-signal modulated carrier which is applied to a mixer 37 for conversion of its frequency by mixing it with a locally generated signal supplied from an oscillator 36. Mixer 37 is a type of mixer having a built-in high-pass filter passing the sum of its input frequencies, while rejecting the difference between its input frequencies. The frequency converted, Q-signal modulated carrier is applied to a limiter 38 and thence to a frequency demodulator 39 and then to a lowpass filter 40 having a frequency range of up to 0.5 MHz which equals the maximum frequency shift of the second frequency modulator 6.

In accordance with the invention, the frequencies of the high and low frequency carriers are determined in a manner which will be described with reference to FIG. 5b. Due to the combined hysteresis characteristics of the video heads B and B' and the magnetic tape on which the chrominance signals are recorded, a third-order distortion noise is contained in the output signal from the video heads B and B'. The third order noise contained in the output signal has a first component at a frequency $3F_Q$ and a second noise component at a frequency $f_I \pm 2f_Q$, where $f_Q$ and $f_I$ represent the frequencies of the Q- and I-signal modulated carriers, respectively. In FIG. 5b, the first noise component $3f_Q$ is indicated at 19 and the second noise component $f_I - 2f_Q$ is indicated at 20. Since the $f_I + 2f_Q$ component is in a high frequency range and significantly attenuated by the video heads, this noise component is out of consideration. In addition to the noise just described, the third-order distortion of the transducer system also produces components which are at frequencies $3f_I$ and $2f_I \pm f_Q$. However, these components can be easily eliminated by the use of a high frequency filter because of the wide separation of the frequencies of these components from the signal of interest. In FIG. 5b, the lower and upper frequency ends of the maximum frequency shift of the I-signal modulated carrier are designated by $f_{IL}$ and $f_{IH}$ which are 5 MHz and 6 MHz, respectively. Likewise, the lower and upper frequency ends of the maximum frequency shift of the Q-signal modulated carrier are designated by $f_{QL}$ and $f_{QH}$ which are 0.75 MHz and 1.25 MHz, respectively. Thus the noise component $3f_Q$ ranges from a frequency $3f_{QL}$ (represented by fa in FIG. 5b) to a frequency $3f_{QH}$ (represented by fd in FIG. 5b). The second noise component $f_I - 2f_Q$ ranges from a frequency $(f_{IL} - 2f_{QH})$ indicated by fb in FIG. 5b to a frequency $(f_{IH} - 2f_{QL})$ indicated by fe in FIG. 5b. Therefore, fa to fe have the following frequency values:

$$fa = 3f_{QL} = 2.25 \text{ MHz}$$
$$fd = 3f_{QH} = 3.75 \text{ MHz}$$
$$fb = [f_{IL} - 2f_{QH}] = 2.5 \text{ MHz}$$
$$fc = [f_{IL} - 2f_{QL}] = 3.5 \text{ MHz, or}$$
$$= [f_{IH} - 2f_{QH}] = 3.5 \text{ MHz}$$
$$fe = [f_{IH} - 2f_{QL}] = 4.5 \text{ MHz}$$

It is seen therefore that when the I and Q signal modulated carriers are reproduced by the video heads B, B', the third-order distortion noise components fa, fb, fc, fd and fe are generated at the output of the amplifier 13. Since the lowpass filter 18 has a frequency range of 2 MHz, all of the noise components contained in the reproduced Q signal carrier are eliminated by the filter 18. On the other hand, the noise components fa and fb contained in the I signal are eliminated by the bandpass filter 17, so that the remainder (fc, fd, fe) appears at the input of the frequency demodulator 49.

Since the Q-signal carrier varies in frequency from $f_{QL}$ to $f_{QH}$, the $3f_Q$ component of the noise which occurs closest to the I-signal modulated carrier is $3f_{QH}$, and the $(f_I - 2f_Q)$ component which occurs closest to the I-signal modulated carrier is $(f_I - 2f_{QL})$. Therefore, the frequency difference between the $2f_{QH}$ component and the lowermost frequency of the I-signal modulated carrier, i.e., $f_{IL}$, is 1.25 MHz ($=f_{IL} - 3f_{QH}$) and the frequency difference between the $(f_I - 2f_{QL})$ component and $f_I$ is 1.5 MHz ($=2f_{QL}$). Therefore, the lowermost frequency of the noise component contained in the demodulated I-signal is 1.25 MHz, whereby the beat frequency components are eliminated by the lowpass filter 50.

Although all the noise components fa to fe can be eliminated by the lowpass filter 18 as mentioned above, these component can also be eliminated by the lowpass filter 40 in a manner similar to that described in connection with the I-signal modulated carrier. More specifically, the noise component which occurs closest to the Q signal is the $3f_Q$ and the $(f_{IL} - 2f_Q)$ components. The frequency difference between these components and the Q-signal modulated carrier is $2f_Q$ and $(f_{IL} - 3f_Q)$. Since the frequency $2f_Q$ decreases with the decrease in frequency $f_Q$, whereas the frequency $(f_{IL} - 3f_Q)$ decreases with the increase in frequency $f_Q$, the lowermost frequency of such noise components is 1.25 MHz ($=f_{IL} - 3f_{QH}$ when $f_Q = f_{QH}$) which is well above the upper limit of the lowpass filter 40.

Therefore, the values of carrier frequencies of the I and Q signals, which are selected to have frequency values of 5.5 MHz and 1 MHz respectively, enable the system to eliminate the primary source of noise arising from the third-order distortion such as $3f_Q$ and the $(f_I - 2f_Q)$ noise components because these components deviate from the frequencies of the demodulated signals by an amount greater than the bandwidth of the demodulated signals. More specifically, the maximum frequency shift ranges of the I- and Q-signal modulated carriers are determined such that the $2f_{QL}$ and the $(f_{IL} - 2f_{QH})$ components fall outside the 1 MHz and 0.5 MHz bandwidths of the demodulated I and Q signals.

It is to be noted that the third-order distortion noise can be made to have a narrower frequency bandwidth by making the maximum frequency shift of the lower frequency signal, i.e., the Q signal, smaller than the maximum frequency shift of the higher frequency signal, i.e., the I signal, since the Q signal is more affected by the noise than the I signal is. Although the signal-to-noise ratio of the Q signal is affected somewhat adversely, the smaller frequency shift range for the Q signal compensates for the loss of signal-to-noise ratio and makes it comparable to the signal-to-noise ratio of the I signal.

Figure 6:
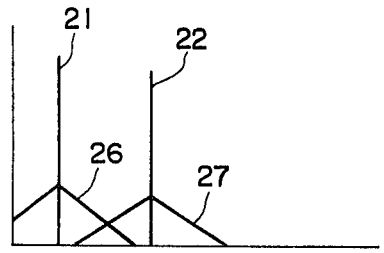
FIG. 6 is a graphic illustration of a spectrum of the fundamental component of a Q signal and its third-order harmonic which is generated by a limiter when the Q signal is in the process of demodulation.

The following description will be concerned with additional noise which occurs as the result of a third-order harmonic generated by the limiter 38 which could amount to as much as −10 dB of the level of the fundamental. The introduction of such third-order harmonic to the Q signal will produce a beat frequency with the noise introduced by the third-order distortion noise. In FIG. 6, the demodulated Q signal and its third-order harmonic are indicated by numerals 21 and 22 and their associated noise components by numerals 26 and 27, respectively. This also applies to the sidebands of the modulated Q signal carrier such that the sideband of the fundamental component interferes with the third-order harmonic of the sidebands to produce beat frequencies.

This interference problem is eliminated by the mixer 37 by appropriately selecting the frequency of the local oscillator 36. For example, with $f_{QL} = 0.75$ MHz and $f_{QH} = 1.25$ MHz as mentioned above, a local oscillator frequency of 5 MHz converts the input frequency of the mixer 37 to a range of 5.75 MHz to 6.25 MHz. This means that the bandwidth of the modulated Q signal carrier ranges substantially from 5 MHz to 7 MHz.

What is claimed is:

1. A video tape recorder having a transducer head on a rotating cylinder, said transducer head having a characteristic to produce third-order distortion noise components in the output signal thereof, comprising:
   first means for frequency modulating a high frequency carrier with a first chrominance signal, said modulated high frequency carrier being applied to said transducer head;
   second means for frequency modulating a low frequency carrier with a second chrominance signal, said modulated low frequency carrier being applied to said transducer head to record said modulated carriers onto a recording medium in frequency-division multiplex;
   third means receptive of the output signal of said transducer heads for frequency demodulating said modulated high frequency carrier so that the demodulated high frequency carrier has a bandwidth of a first predetermined value; and
   fourth means receptive of said output signal for frequency demodulating said modulated low frequency carrier so that the demodulated low frequency carrier has a bandwidth of a second predetermined value,
   wherein said high and low frequency carriers have such frequencies that the frequencies of said third order distortion noise components differ from the frequencies of the demodulated carriers by amounts greater than the bandwidths of said first and second predetermined values.

2. A video tape recorder as claimed in claim 1, wherein said third order distortion noise components have a first component whose frequency is three times the frequency of said modulated low frequency carrier and a second component whose frequency equals the frequency difference between the frequency of said modulated high frequency carrier and twice the frequency of said modulated low frequency carrier, and further comprising means for selecting said high and low frequency carriers to have such frequencies that the frequencies of said first and second noise components differ from the frequencies of the modulated high and low frequency carriers by amounts greater than said first and second predetermined values, respectively.

3. A video tape recorder as claimed in claim 2, further comprising means for providing the modulated high frequency carrier has a greater bandwidth than the bandwidth of said modulated low frequency carrier, and wherein said first predetermined value is greater than said second predetermined value.

4. A video tape recorder as claimed in claim 2 or 3, further comprising a lowpass filter connected between said transducer head and said fourth means, the frequency range of said lowpass filter being lower than the lowermost frequency of said first and second noise components.

5. A video tape recorder as claimed in claim 1 wherein said third means comprises fifth means for setting said bandwidth of a first predetermined value to equal a maximum frequency shift of said frequency modulated high frequency carrier and wherein said fourth means includes sixth means for setting said bandwidth of a second predetermined value to equal a maximum frequency shift of said frequency modulated low frequency carrier.

6. A video tape recorder as claimed in claim 1 wherein said means for causing comprises means for setting maximum frequency shifts of said high and low frequency modulated carriers provided by said first and second means to said first and second predetermined values, respectively.

7. A video tape recorder as claimed in any one of claims 1, 2, 3, 5, or 6, wherein said first and second means are connected for modulating said high and low frequency carriers with I and Q signals, respectively.

8. A video tape recorder as claimed in any one of claims 1, 2, 3, 5, or 6 wherein said fourth means comprises a frequency converter means for converting the frequency of the modulated low frequency carrier to a higher frequency and a limiter connected to the output of said frequency converter.

9. A video tape recorder having a transducer head on a rotating cylinder, said transducer head having a characteristic to produce third-order distortion noise components in the output signal thereof, comprising:
first means for frequency modulating a high frequency carrier with a first chrominance signal, said modulated high frequency carrier being applied to said transducer head;
second means for frequency modulating a low frequency carrier with a second chrominance signal, said modulated low frequency carrier being applied to said transducer head to record said modulated carriers onto a recording medium in frequency-division multiplex;
third means receptive of the output signal of said transducer heads for frequency demodulating said modulated high frequency carrier so that the demodulated high frequency carrier has a bandwidth of a first predetermined value; and
fourth means receptive of said output signal for frequency demodulating said modulated low frequency carrier so that the demodulated low frequency carrier has a bandwidth of a second predetermined value; and
means for causing said third order distortion noise components to have frequencies differing from frequencies of said demodulated high and low frequency carriers by more than said first and second predetermined value, respectively.

10. A video tape recorder as claimed in claim 9 wherein said means for causing comprises means for selecting frequencies of said high and low frequency carriers to values causing said third order distortion noise components to have frequencies differing from frequencies of said demodulated high and low frequency carriers by more than said first and second predetermined value, respectively.

11. A video tape recorder as claimed in claim 9 wherein said means for causing includes means for selecting high and low carrier frequencies such that the maximum frequency shift ranges of the modulated high and low frequency carriers and said third order noise components are separated from one another by frequency differences at least equal to respective bandwidths of said first and second chrominance signals.

12. A video tape recorder as claimed in claim 9 wherein said third means is connected to a low-pass filter having a frequency range substantially equal to the base band bandwidth of said first chrominance signal, and
wherein said fourth means is connected to a low-pass filter having a frequency range substantially equal to the base band bandwidth of said second chrominance signal.

* * * * *